(12) United States Patent
Stiefvater et al.

(10) Patent No.: US 6,497,087 B1
(45) Date of Patent: Dec. 24, 2002

(54) CROP CONVEYING DRUMS FOR A DISC CUTTERBAR

(75) Inventors: Thomas L. Stiefvater, Ephrata, PA (US); Wilburn H. Potter, Strasburg, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/841,101

(22) Filed: Apr. 25, 2001

Related U.S. Application Data

(60) Provisional application No. 60/200,087, filed on Apr. 27, 2000.

(51) Int. Cl.$^7$ ............................................... A01D 61/00
(52) U.S. Cl. ........................ 56/16.6; 56/136; 56/DIG. 5
(58) Field of Search ...................... 56/6, 13.6, 16.4 R, 56/16.4 A, 16.4 B, 16.6, 157, 255, 295, DIG. 5, DIG. 20, 13.9, 13.5, 14.5

(56) References Cited

U.S. PATENT DOCUMENTS

| | | | |
|---|---|---|---|
| 4,428,185 A | * 1/1984 | Toillie et al. ................. | 56/13.6 |
| 4,972,664 A | * 11/1990 | Frey ............................. | 56/13.6 |
| 5,031,391 A | * 7/1991 | Meijering .................... | 56/13.6 |
| 5,179,822 A | 1/1993 | McLean | |
| 5,272,859 A | * 12/1993 | Pruitt et al. ................... | 56/15.2 |
| 5,345,752 A | * 9/1994 | Pruitt et al. ................... | 56/13.6 |
| 5,404,695 A | * 4/1995 | Gemelli ....................... | 56/13.6 |
| 5,430,997 A | * 7/1995 | O'Halloran et al. ..... | 56/10.2 H |
| 5,433,064 A | 7/1995 | Schmitt et al. | |
| 5,463,852 A | * 11/1995 | O'Halloran et al. ....... | 56/13.69 |
| 5,842,330 A | 12/1998 | Richardson et al. | |
| 5,996,323 A | 12/1999 | Campbell et al. | |
| 6,158,201 A | 12/2000 | Pruitt et al. | |
| 6,318,055 B1 | * 11/2001 | Bird ........................... | 56/13.6 |

* cited by examiner

Primary Examiner—Robert E. Pezzuto
Assistant Examiner—Nathan Mammen
(74) Attorney, Agent, or Firm—Larry W. Miller; John William Stader

(57) ABSTRACT

A crop conveying drum for a drive disc cutter is mounted directly to the drive shaft mechanism providing rotational power to the cutterbar. The crop conveying drum is formed as mating segments, each forming a half of the drum. Each segment has a pair of support bars vertically oriented and extending between connecting flanges. A mounting bracket centrally supported by the vertical support bars is formed to partially wrap around the drive shaft mechanism. The mounting bracket has holes therein for the passage of fasteners to connect the drum segment directly to the drive shaft mechanism so that the crop conveying drum rotates with the drive shaft mechanism. Upper and lower mating connecting flanges are fastened together to form the entire crop conveying drum rotatable with the drive shaft. The crop conveying drum assists in conveying severed crop material laterally from outlying disc cutters that define a cutting width of the cutterbar that is greater than the operating width of the conditioning rolls. The crop conveying drum is formed in an open configuration to allow the passage of severed crop through the drum so that severed crop cannot accumulate on the drive shaft mechanism to cause an unbalance therein and premature failure of the universal joints due to the wrapping of crop material.

14 Claims, 5 Drawing Sheets

Fig. 5
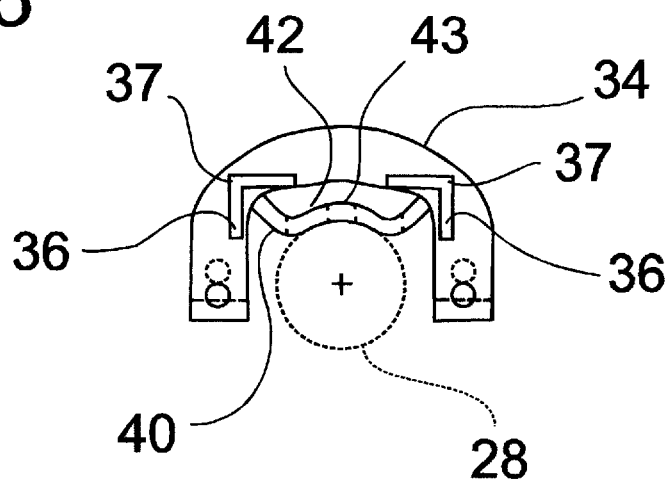
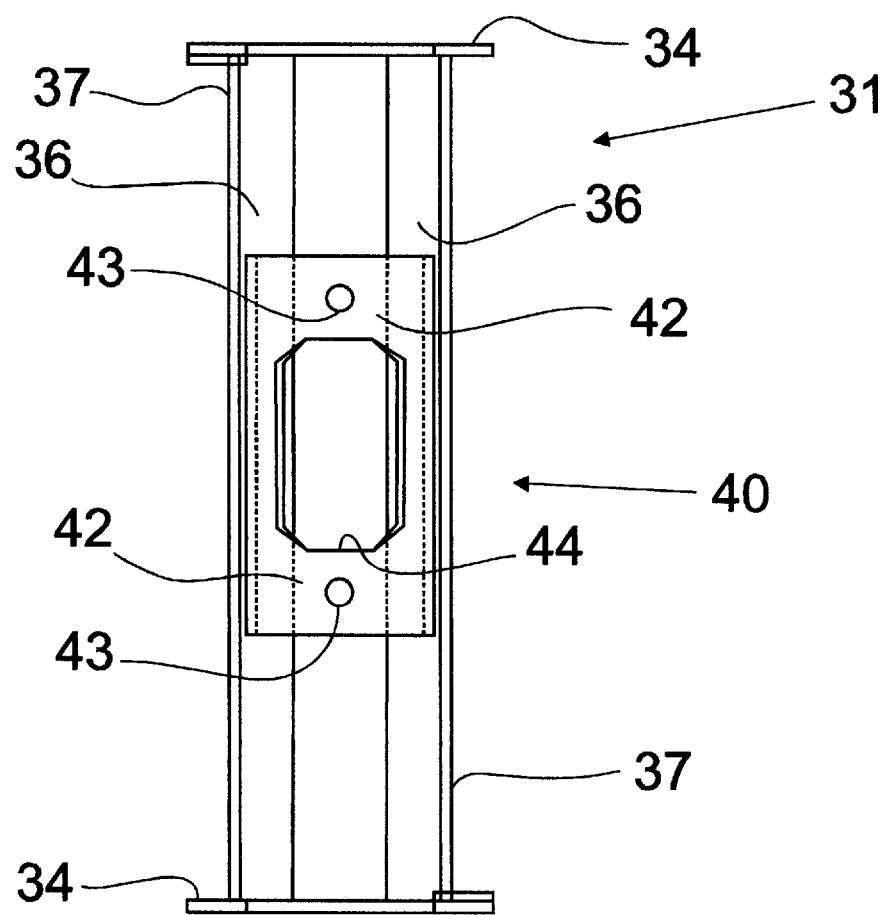
Fig. 4

CROP CONVEYING DRUMS FOR A DISC CUTTERBAR

CROSS REFERENCE TO RELATED APPLICATIONS

This application claims domestic priority on U. S. Provisional Patent Application Serial No. 60/200,087, filed Apr. 27, 2000, the contents of which are incorporated herein by reference.

FIELD OF THE INVENTION

This invention relates generally to a machine for harvesting crops in a field and, more particularly, to a disc cutterbar having an operating width greater than the width of the crop harvesting mechanism operating rearwardly of the disc cutterbar.

BACKGROUND OF THE INVENTION

In modern crop harvesting machines, such as those having rotary disc cutterbars, the desire is to increase the width of cut of the machines to reduce the length of time the machine is operated in the field. Crop harvesting machines, such as those used to harvest hay and forage crops, typically have a conditioning mechanism mounted rearwardly of the crop cutting mechanism to crack the stems of the crop and enhance drying, as is well known in the art. The width of the conditioning rolls is limited due to manufacturing tolerances, operating tolerances and financial considerations. Accordingly, increasing the operating width of the cutting mechanism does not necessarily result in an equivalent increase in the width of the conditioning rolls.

Having the conditioning rolls with a transverse width less than the transverse cutting width of the disc cutterbar requires that the severed crop be conveyed laterally and inwardly for a distance before being fed rearwardly into the conditioning rolls. A number of devices have been created to effect the conveyance of this severed crop. One such mechanism can be found in U.S. Pat. No. 5,842,330, issued on Dec. 1, 1998. In this mechanism, the cutterbar is provided with short drums and baffles to direct the severed crop material into the conditioning mechanism. Augers or conveying belts could also be used behind the outboard disc cutters to provide a live wall that would convey the severed crop mechanically into the conditioning mechanism. Such devices, however, would be mechanically complex and, therefore, expensive to manufacture, maintain and operate.

Another such conveying mechanism can be found in U.S. Pat. No. 6,158,201, issued on Dec. 12, 2000, and U.S. Pat. No. 5,433,064, issued on Jul. 18, 1995, in which the outlying disc cutters are provided with a set of conveying drums some of which may be mounted between the disc cutters and independently driven to present a rotating wall that conveys the severed crop inwardly for feeding into the conditioning mechanism. In this particular configuration, the outlying disc cutters are co-rotated, i.e., rotated in the same direction so that the severed crop material is directed inwardly from the beginning.

In one known configuration, a drive shaft mechanism depends downwardly fromn the superstructure of the cutterbar to pass through one of the disc cutters and provide driving power to the cutterbar, similar to that shown in U.S. Pat. No. 5,179,822, issued on Jan. 19, 1993, to Kenneth W. McLean, et al. The positioning of this drive shaft mechanism further complicates the conveyance of severed crop toward the middle of the cutterbar. The rapidly rotating drive shaft is subject to being unbalanced from an accumulation of severed crop. One skilled in the art will recognize that the drive shaft mechanism will include universal joints to permit a flexible movement of the cutterbar relative to the superstructure from which the drive shaft mechanism depends. Mounting a drum on the disc cutter, as is known in the art, to be rotatable therewith does not present a viable solution to shielding the drive shaft mechanism as a large amount of internal clearance would be necessary due to the deflection of the top of the drum with even small movements of the disc cutterbar.

Accordingly, it would be desirable to provide a device that would protect the drive shaft mechanism from being overloaded with severed crop material while providing assistance in conveying the severed crop inwardly for feeding into the conditioning mechanism around the corner defined by the barrier presented by the drive shaft mechanism providing rotational power to the disc cutterbar.

SUMMARY OF THE INVENTION

It is an object of this invention to overcome the disadvantages of the prior art by providing a crop conveying drum mounted to the drive shaft mechanism delivering rotational power to the disc cutterbar from an overhead implement superstructure.

It is an advantage of this invention that the rotating drum assists in conveying severed crop material inwardly for feeding to the conditioning mechanism.

It is a feature of this invention that the crop conveying drum is mounted directly to the drive shaft mechanism to be rotatable therewith.

It is another advantage of this invention that the crop conveying drum can be formed with a smaller diameter than would be possible with the drum mounted directly to the disc cutter.

It is still another advantage of this invention that any crop accumulation within the conveying drum does not cause interference with the operation of the drive shaft mechanism.

It is another feature of this invention that the conveying drum rotate with the drive shaft mechanism so that there is no relative rotational movement therebetween.

It is still another feature of this invention that there is no horizontal movement of the crop conveying drum relative to the drive shaft mechanism.

It is yet another advantage of this invention that the crop conveying drum protecting the drive shaft mechanism can be formed longer than would be possible with the drum mounted directly to the disc cutter because tipping motion of the drum is eliminated by mounting the drum directly to the drive shaft mechanism.

It is another object of this invention to provide a crop conveying drum that is operable to shed crop material accumulated therein.

It is yet another feature of this invention that the conveying drum is formed of two identical halves that are clamped to the drive shaft mechanism.

It is still another object of this invention to provide a crop conveying drum having an optimally compact construction.

It is another feature of this invention to provide an open drum construction to provide a passage for severed crop material to pass through without accumulating in the drum.

It is a further advantage of this invention that the severed crop material will not be permitted to accumulate within the drum to cause unbalance in the drive line.

It is still another feature of this invention that the drum is provided with slats on the outer periphery to provide aggressiveness in conveying severed crop material inwardly and rearwardly around the drum.

It is yet another object of this invention to provide a crop conveying drum for the universal joint drive line providing rotational power to a disc cutterbar which is durable in construction, inexpensive of manufacture, carefree of maintenance, facile in assemblage, and simple and effective in use.

These and other objects, features and advantages are accomplished according to the instant invention by providing a crop conveying drum for a drive disc cutter mounted directly to the drive shaft mechanism to provide rotational power to the cutterbar. The crop conveying drum is formed as mating segments, each forming a half of the drum. Each segment has a pair of support bars vertically oriented and extending between connecting flanges. A mounting bracket centrally supported by the vertical support bars is formed to partially wrap around the drive shaft mechanism. The mounting bracket has holes therein for the passage of fasteners to connect the drum segment directly to the drive shaft mechanism so that the crop conveying drum rotates with the drive shaft mechanism. Upper and lower mating connecting flanges are fastened together to form the entire crop conveying drum rotatable with the drive shaft. The crop conveying drum assists in conveying severed crop material laterally from outlying disc cutters that define a cutting width of the cutterbar that is greater than the operating width of the conditioning rolls. The crop conveying drum is formed in an open configuration to allow the passage of severed crop through the drum so that severed crop cannot accumulate on the drive shaft mechanism to cause an unbalance therein and premature failure of the universal joints due to the wrapping of crop material.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is an elevational view of a drum segment forming half of the crop conveying drum shown in FIG. 3;

FIG. 5 is an end view of the drum segment depicted in FIG. 4 shown in relationship to the drive shaft to which the drum segment is mounted;

DETAILED DESCRIPTION OF THE PREFERRED EMBODIMENT

Figure 1:
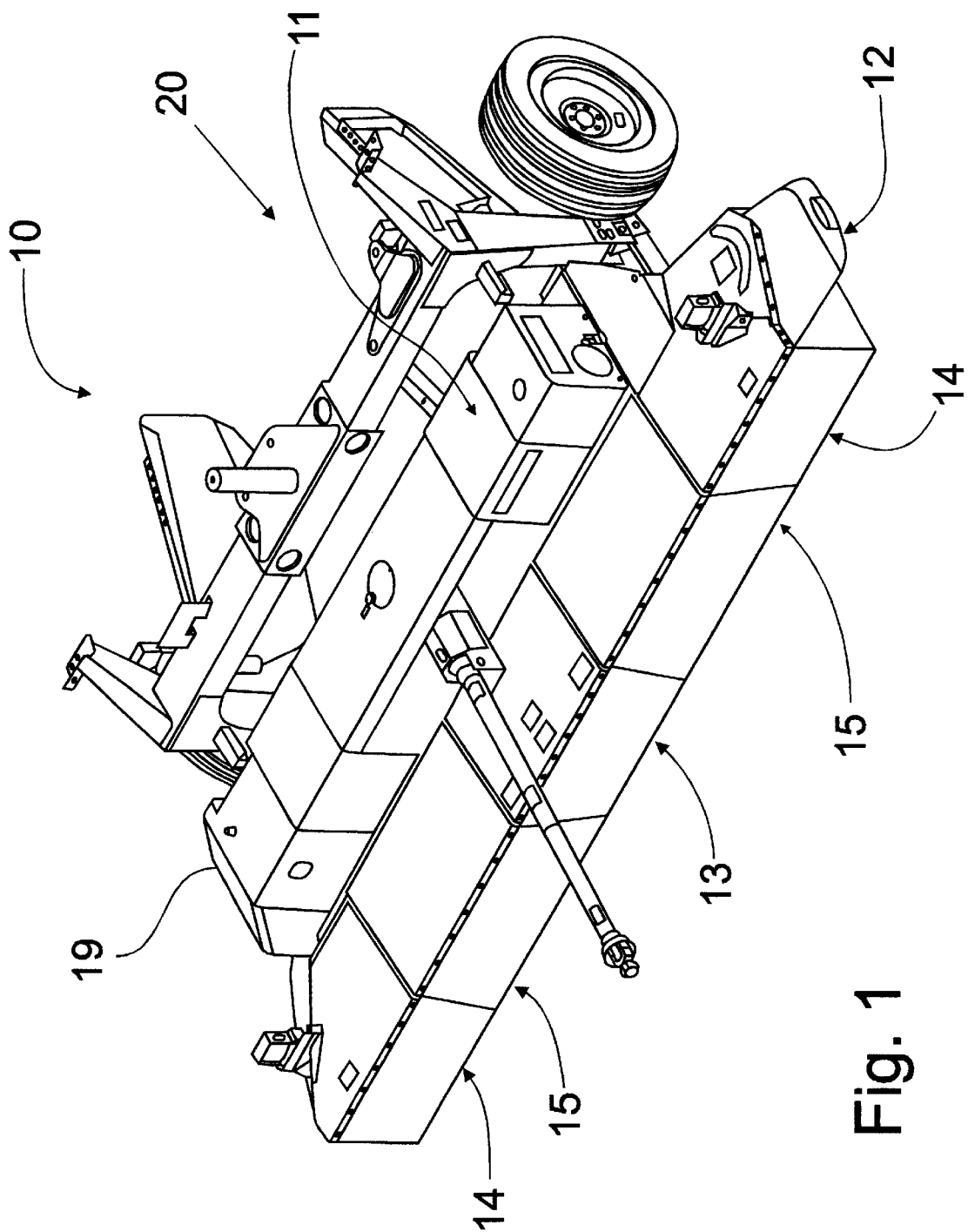
FIG. 1 is a schematic, left front perspective view of a crop harvesting machine incorporating the principles of the present invention.
Figure 2:
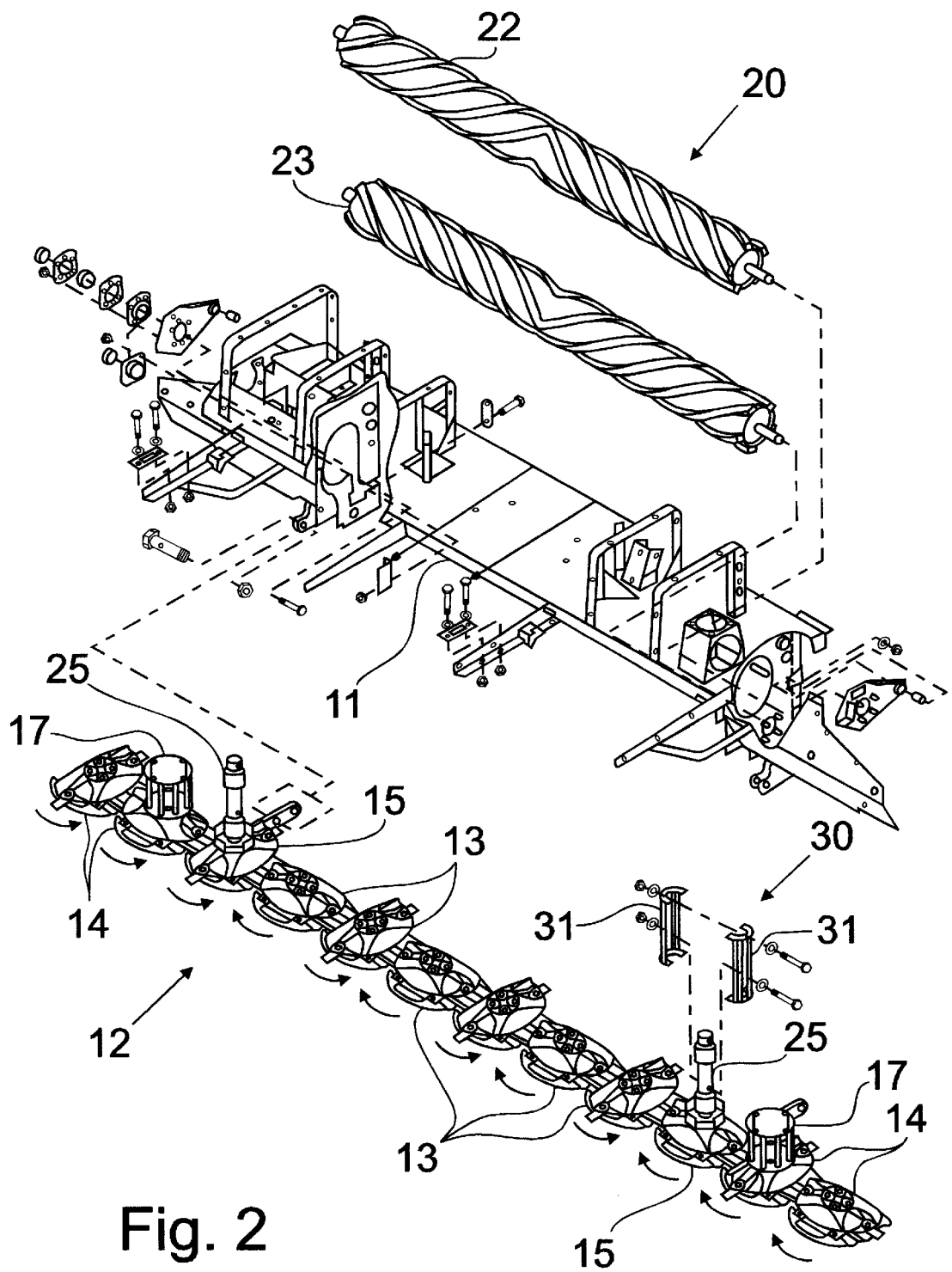
FIG. 2 is an exploded perspective view of the frame, disc cutterbar; and conditioning rolls of the crop harvesting machine depicted in FIG. 1.

Referring first to FIGS. 1 and 2, a crop harvesting machine 10, commonly referred to as a windrower or a mower-conditioner and customarily used to harvest hay, can best be seen. This configuration of the crop harvesting machine 10 includes a disc cutterbar 12 operable to sever standing crop material with a rotary impact action, as is well known in the art. The disc cufterbar 12 includes a plurality of disc cutters 13–15 arranged in a transversely spaced configuration to define the cutting width of the disc cutterbar 12. The cutterbar 12 includes interior disc cutters 13, outlying disc cutters 14 and drive cutters 15 positioned between the interior disc cutters 13 and the outlying disc cutters 14. Adjacent interior disc cutters 13 are rotated in opposite directions so as to be effective to cut the standing crop material and then convey the severed crop material between the disc cutters 13 that converge in the paths of rotation.

The general operation and construction of a disc cutterbar 12 can be found in U.S. Pat. No. 5,996,323, issued on Dec. 7, 1999, to Steven J. Campbell, et al, the descriptive portions of which are incorporated herein by reference. The outlying disc cutters 14 depart from the teachings of the aforementioned Campbell patent because the outlying disc cutters 14 co-rotate toward the interior disc cutters 13. The drive disc cutters 15 rotate in the same direction as the outlying disc cutters 14 to cut standing crop material and convey the severed crop material inwardly toward the interior disc cutters 13 so that the crop can be conveyed inwardly and rearwardly. One skilled in the art will recognize that some embodiments of crop harvesting machines are not provided with a conditioning mechanism, in which case the crop would be deposited on the ground. In those crop harvesting machine configurations having the inward and rearward conditioning mechanism, the rotation of the disc cutters 13–15 will operate to convey severed crop into the crop conditioner.

The crop harvesting machine 10 also includes a crop conditioning mechanism 20 supported by the frame 19 of the crop harvesting machine 10 immediately rearwardly of the disc cutterbar 10. The preferred embodiment of the conditioning mechanism 20 is a pair of counter-rotating, intermeshing conditioning rolls 22, 23, which are well known in the art; however, other forms of conditioning devices, such as flail conditioners, could also be provided. The transverse length of the conditioning rolls 22, 23 is effectively limited by the construction and operation of the rolls 22, 23. These conditioning rolls 22, 23 require an intermeshing relationship to operate properly, thus mandating the maintenance of certain tolerances during operation. Merely increasing the length of the rolls 22, 23 to match the operating width of the larger disc cutterbars 12 results in unacceptable deflections of the conditioning rolls 22, 23, disrupting the intermeshing relationship between the rolls 22, 23. Other limitations restricting the overall length of the conditioning rolls 22, 23 include the weight of the rolls and the manufacturing process. Extraordinarily long conditioning rolls 22, 23 would have a prohibitive cost. For similar reasons, other forms of conditioning mechanisms are also preferably constructed with a transverse width less than that of the cutterbar 12.

Because of the practicalities limiting the transverse length of the conditioning rolls 22, 23, the greater operating widths of the disc cutterbars 12 require that only the interior disc cutters 13 be operable to convey severed crop material directly into the rapidly rotating conditioning mechanism 20. The outlying disc cutters 14 must be operable to convey the severed crop material inwardly toward the interior disc cutters 13, since there is no operating portion of the conditioning mechanism 20 located immediately rearwardly of the outlying disc cutters 14. At least one of the outlying disc cutters 14 is provided with a conveying drum 17 mounted directly thereto to be rotatable therewith to urge severed crop material inwardly with the corresponding rotation of the outlying disc cutter 14. The drive disc cutters 15 are positioned to be partially in front of the conditioning mechanism 20; however, the proper rotation of the drive disc cutters 15 will move the crop material severed thereby into the operating width of the conditioning mechanism 20.

The drive disc cutters 15 have a drive shaft mechanism 25 depending downwardly from the overhead superstructure 11 directly into the center of the drive disc cutter 15 to engage the drive train (not shown) within the cutterbar 12 to effect rotational operation thereof in a conventional manner. The general construction and operation of an inboard drive shaft mechanism 25 can be found in U.S. Pat. No. 5,179,822, issued to Kenneth W. McLean on Jan. 19, 1993, the descriptive portions thereof being incorporated herein by reference. On smaller disc cutterbars 12, e.g., cutterbars having an operating cutting width approximately equal to the transverse operating width of the conditioning mechanism 20, the drive shaft mechanism 25 can be positioned in alignment with approximately the transverse ends of the conditioning mechanism 20. Thus, the drive shaft mechanism 25 is not a significant problem with the conveying of severed crop material to the conditioning mechanism 20, as most of the severed crop material is moved inwardly of the drive shaft mechanism 20 before being conveyed rearwardly into the conditioning mechanism 20.

Construction of the larger disc cutterbars 12, e.g., disc cutterbars having an operating cutting width significantly greater than the transverse operating width of the conditioning mechanism 20, add one, two or more outlying disc cutters 14 outboard of the drive disc cutters 15. Hence, the direction of rotation of these outlying disc cutters 14 must to co-rotational and be in the direction required to convey crop inwardly toward the interior disc cutters 13. With the drive shaft mechanism 25 positioned interiorly of the outlying disc cutters 14, the severed crop must move inwardly past the drive shaft mechanism 25 before turning the corner to move rearwardly into the conditioning mechanism 20. Accordingly, it would be desirable to place a device over the drive mechanism 25 to help move severed crop material around the corner defined by the downwardly depending drive shaft mechanism 25.

Figure 3:
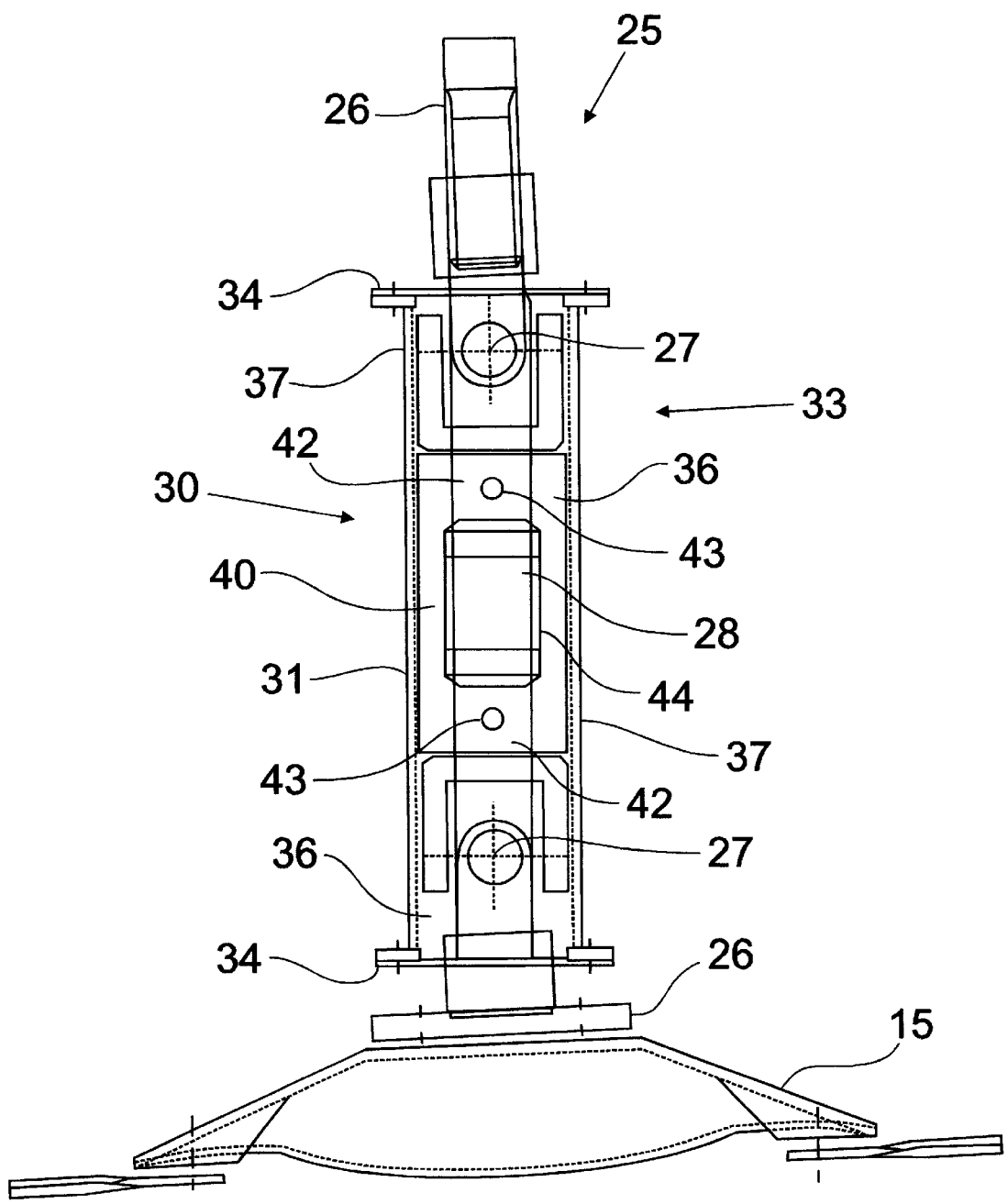
FIG. 3 is an enlarged elevational view of a disc cutter having a drive shaft mechanism associated therewith to provide rotational power to the disc cutterbar, the drive shaft mechanism having a crop conveying drum incorporating the principles of the instant invention mounted to the drive shaft mechanism.
Figure 7:
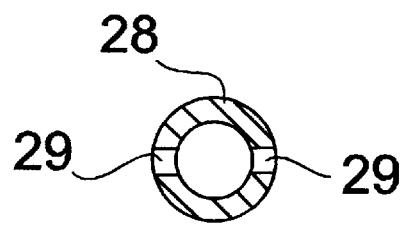
FIG. 7 is a cross-sectional view of the drive shaft mechanism corresponding to lines 7—7 of FIG. 6.
Figure 6:
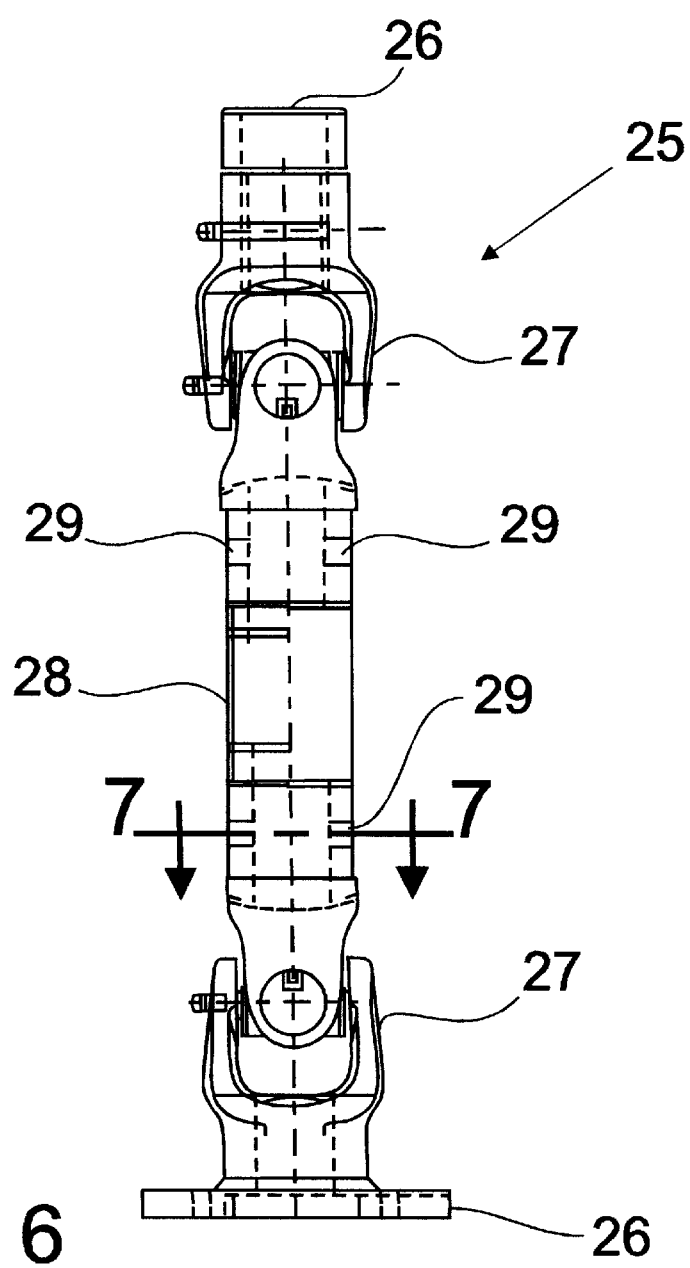
FIG. 6 is an enlarged elevational view of the drive shaft mechanism having a pair of opposing universal joints, the drive shaft being adapted for the mounting of the crop conveying drum thereto.

The crop conveying drum 30 is best seen in FIGS. 3–5, while the drive shaft mechanism 25 is best depicted in FIGS. 6 and 7. The drive shaft mechanism 25 includes upper and lower connecting devices 26, a pair of opposing universal joints 27, and a central shaft 28. The drive shaft mechanism 25 permits a slight expansion of the distance between the upper frame superstructure and the cutterbar 12 so that the drive shaft mechanism 25 flexes with the movement of the disc cutterbar 12. The drive shaft mechanism 25 includes a pair of mounting holes 29 formed in the central shaft 28 for the mounting of the crop conveying drum 30, as will be described in greater detail below. The crop conveying drum 30 is preferably formed in a two-piece configuration in opposing segments 31 forming approximately half of the drum 30. Each segment 31 includes an elongated crop conveying portion 33 terminating in opposing connecting flanges 34 at opposite ends. The crop conveying portion 33 is preferably open in construction with a pair of spaced support bars 36 extending from one connecting flange 34 to the other. Preferably, the support bars 36 are formed as angled members, best seen in FIG. 5, to define outwardly protruding slats 37 at the points of the support bars 36 to provide an aggressive engagement of the severed crop material to urge movement thereof in the direction the crop conveying drum 30 is rotating.

Centrally between the connecting flanges 34, a mounting bracket 40 is formed to permit connection of the crop conveying drum 30 to the drive shaft mechanism 25. The preferable shape of the mounting bracket 40 is in the form of a rectangular doughnut with a central opening 44 to clear the center section of the central shaft 28. The mounting bracket 40 is preferably formed with a pair of central arched portions 42 shaped to conform to the cylindrical shape of the machined portion of the central shaft 28. Each arched portion 42 is formed with a central hole 43 for the insertion of hardware through the central hole 43 into the hole 29 formed in the central shaft 28 to affix the individual segments 31 of crop conveying drum 30 directly to the drive shaft mechanism 25. The connecting flanges 34 of one segment 31 are formed to be mating in configuration with the corresponding connecting flange 34 of the other, opposing segment 31. The connecting flange 34 of one segment 31 will fit securely under the connecting flange of the opposing segment 31 so that connecting hardware can be positioned through aligned openings to secure the two segments 31 into a single crop conveying drum 30.

The aggressive slats 37 act to move severed crop away from the disc cutterbar 12 toward the interior disc cutters 13 and also rearwardly into the conditioning mechanism 20. The open construction of the crop conveying drum 30 allows any severed crop material passing into the drum area to move through the crop conveying drum 30 so that no crop can accumulate inside the drum 30 to cause an unbalancing of the drive shaft mechanism 25. The crop conveying drum 30 is mounted directly to the drive shaft mechanism 25 so that there can be no relative movement therebetween. This relationship also helps to keep crop material from accumulating within the drum 30. The crop conveying drum 30 can be as long as desired. Since the drum is mounted on the drive shaft mechanism 25 instead of the drive disc cutter 15, there is no relative tipping between the drum 30 and the drive shaft mechanism 25, thus permitting the diameter of the drum 30 to be relatively small, and therefore light and compact.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. In a crop harvesting machine having a frame, a disc cutterbar supported on said frame to sever standing crop material, said disc cutterbar including a plurality of interior disc cutters, a plurality of outlying disc cutters, and at least one drive disc cutter; a central opening defined by said frame rearwardly of said disc cutterbar to receive severed crop material from said cutterbar; a drive mechanism including a drive shaft mechanism connected directly to said at least one drive disc cutter to direct rotational power to said disc cutterbar for operation of all of said disc cutters, the improvement comprising:

a crop conveying drum mounted on said drive shaft mechanism above said drive disc cutter to convey severed crop material inwardly and rearwardly of said crop conveying drum, said drive shaft mechanism including a pair of universal joints and a central shaft interconnecting said universal joints, said crop conveying drum including first and second segments terminating in opposing connecting flanges, each of said segments including a pair of generally vertical, spaced-apart support bars and a mounting bracket centrally positioned and affixed to said support bars and being located between said connecting flanges, said mounting bracket including an arched portion for a mating engagement with said central shaft, said arched portion including an opening therein for alignment with corresponding holes in said central shaft.

2. The crop harvesting machine of claim 1 wherein said crop conveying drum being mounted to said central shaft to be rotatable with said drive shaft mechanism.

3. The crop harvesting machine of claim 2 wherein each of said segments forms approximately half of said crop conveying drum.

4. The crop harvesting machine of claim 3 wherein said crop conveying drum is in a substantially open drum configuration.

5. A hay harvesting machine comprising:
- a frame;
- a disc cutterbar supported on said frame to sever standing crop material, said disc cutterbar including a plurality of disc cutters, at least one of said disc cutters being a drive disc cutter;
- a conditioning mechanism supported on said frame rearwardly of said disc cutterbar to receive severed crop material from said cutterbar;
- a drive mechanism including a drive shaft mechanism connected directly to said at least one drive disc cutter to direct rotational power to said disc cutterbar for rotational operation of all of said disc cutters said drive shaft mechanism includes a pair of universal joints with a central shaft interconnecting said universal joints; and
- a crop conveying drum mounted on said drive shaft mechanism above said at least one drive disc cutter to convey severed crop material to said conditioning mechanism, said crop conveying drum being mounted directly to said central shaft via a mounting bracket to be rotatable with said drive shaft mechanism.

6. The crop harvesting machine of claim 5 wherein said disc cutterbar further includes a plurality of interior disc cutters, a plurality of outlying disc cutters on opposing transverse ends of said interior disc cutters, and one of said drive disc cutters positioned between said outlying disc cutters and said interior disc cutters at each transverse end thereof.

7. The crop harvesting machine of claim 6 wherein said crop conveying drum comprises first and second segments, each of said segments forming approximately half of said crop conveying drum.

8. The crop harvesting machine of claim 7 wherein each said segment of said crop conveying drum includes a pair of generally vertical, spaced-apart support bars.

9. The crop harvesting machine of claim 8, wherein said mounting bracket is centrally positioned and affixed to said support bars to form a substantially open drum configuration.

10. The crop harvesting machine of claim 5 wherein said mounting bracket includes an arched portion for a mating engagement with said central shaft, said arched portion including openings therein for alignment with corresponding holes in said central shaft.

11. A crop conveying drum for a disc cutterbar on a hay harvesting machine, said disc cutterbar including a drive disc cutter having a drive mechanism connected thereto and extending generally vertically therefrom, said drive mechanism including a pair of universal joints with a central shaft interconnecting said universal joints, comprising:
- two pairs of generally vertical, spaced-apart support bars and a pair of opposing mounting brackets, each of said mounting brackets including an arched portion for a mating engagement with said central shaft and being centrally positioned and affixed to a corresponding pair of said support bars to form a substantially open drum configuration, said mounting brackets being connected to said central shaft so as to be rotatable therewith, said arched portion including openings therein for alignment with corresponding holes in said central shaft.

12. The crop conveying drum of claim 11 comprising first and second segments, each of said segments including one of said pairs of support bars and a corresponding said mounting bracket, each said segment forming approximately half of said crop conveying drum.

13. The crop conveying drum of claim 12 wherein said mounting brackets are detachably connected to said central shaft by fasteners.

14. The crop conveying drum of claim 13 wherein each said segment further comprises upper and lower connecting flanges configured to mate with the opposing said connecting flange with fasteners interconnecting mating connecting flanges to form said crop conveying drum.

\* \* \* \* \*